(12) United States Patent
Nadeau et al.

(10) Patent No.: US 9,266,417 B2
(45) Date of Patent: Feb. 23, 2016

(54) MULTI-PASSENGER RECREATIONAL UTILITY VEHICLE

(71) Applicant: BOMBARDIER RECREATIONAL PRODUCTS INC., Valcourt (CA)

(72) Inventors: Daniel Nadeau, St-Denis de Brompton (CA); Stephane Sanschagrin, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/376,011

(22) PCT Filed: Jan. 31, 2013

(86) PCT No.: PCT/US2013/024043
§ 371 (c)(1),
(2) Date: Jul. 31, 2014

(87) PCT Pub. No.: WO2013/116459
PCT Pub. Date: Aug. 8, 2013

(65) Prior Publication Data
US 2015/0041237 A1      Feb. 12, 2015

Related U.S. Application Data

(60) Provisional application No. 61/593,074, filed on Jan. 31, 2012.

(51) Int. Cl.
*B60K 5/00* (2006.01)
*B60R 7/00* (2006.01)
(Continued)

(52) U.S. Cl.
CPC . *B60K 5/00* (2013.01); *B60K 17/34* (2013.01); *B60N 2/005* (2013.01); *B60N 3/02* (2013.01);
(Continued)

(58) Field of Classification Search
CPC ............ B60R 7/00; B60R 7/04; B60R 7/043; B60K 17/34; B60N 2/005

USPC ......................... 180/233; 296/37.15; 224/275
See application file for complete search history.

(56) References Cited

U.S. PATENT DOCUMENTS

| | | | |
|---|---|---|---|
| 6,082,802 A | 7/2000 | Vigilante, Jr. | |
| 6,719,344 B2 | 4/2004 | Ono et al. | |
| 7,363,999 B2 * | 4/2008 | Hastings | 180/220 |
| 7,677,343 B2 * | 3/2010 | Kitai et al. | 180/89.17 |
| 7,819,220 B2 | 10/2010 | Sunsdahl et al. | |
| 8,316,977 B2 * | 11/2012 | Tsumiyama et al. | 180/89.17 |

(Continued)

OTHER PUBLICATIONS

Search Report of International Application No. PCT/US2013/024043. Published on Aug. 8, 2013. USPTO—Blaine R. Copenheaver.

*Primary Examiner* — John Walters
*Assistant Examiner* — Brian Swenson
(74) *Attorney, Agent, or Firm* — BCF LLP

(57) ABSTRACT

Multi-passenger recreational utility vehicle comprising: a frame; two front wheels suspended from the frame via a front suspension assembly; two rear wheels suspended from the frame via a rear suspension assembly; an open-air seating area; a front driver seat; a front passenger seat; two rear passenger seats; each seat having a seat base and a backrest; a roll cage; a steering device; an engine; a transmission; a center console extending within the seating area intermediate the seats, a first portion of the center console forming a storage compartment within the console; a storage compartment cover covering the storage compartment, the storage compartment cover forming a rear passenger armrest when covering the storage compartment; and an inner accessory inside the center console, the inner accessory being removeable from the center console, the inner accessory being selectively openable.

26 Claims, 16 Drawing Sheets

(51) Int. Cl.
*B60R 7/04* (2006.01)
*B60K 17/34* (2006.01)
*B60N 2/005* (2006.01)
*B60N 3/02* (2006.01)
*B62D 23/00* (2006.01)

(52) U.S. Cl.
CPC ... *B60R 7/00* (2013.01); *B60R 7/04* (2013.01); *B62D 23/005* (2013.01); *B60K 2005/003* (2013.01)

(56) References Cited

U.S. PATENT DOCUMENTS

| | | | |
|---|---|---|---|
| 8,464,827 B2 * | 6/2013 | Tsumiyama et al. | 180/311 |
| 2009/0183938 A1 | 7/2009 | Cover et al. | |
| 2009/0184537 A1 * | 7/2009 | Yamamura et al. | 296/65.09 |
| 2009/0184541 A1 * | 7/2009 | Yamamura et al. | 296/190.08 |
| 2010/0181134 A1 | 7/2010 | Sugiura | |
| 2011/0057477 A1 * | 3/2011 | Yamaki et al. | 296/187.12 |
| 2011/0298189 A1 | 12/2011 | Schneider et al. | |
| 2013/0038080 A1 * | 2/2013 | Tate, Jr. | 296/37.5 |

* cited by examiner

MULTI-PASSENGER RECREATIONAL UTILITY VEHICLE

CROSS-REFERENCE

The present application claims priority to U.S. Patent Application No. 61/593,074, filed Jan. 31, 2012, entitled "Multi-Passenger Recreational Utility Vehicle", the entirety of which is incorporated herein by reference in those jurisdictions allowing for incorporations-by-reference.

FIELD OF THE INVENTION

The present invention relates to multi-passenger recreational utility vehicles.

BACKGROUND

Recreational utility vehicles (RUVs) (also known in the art as side-by-side vehicles (SSVs)) are a new class of vehicle that has been developed by manufacturers over the past few years as an off-shoot of all-terrain vehicles (ATVs). While there is no "standard" definition of an RUV, in the present context, an RUV is an off-road vehicle for transporting a small number of persons sitting in a side-by-side configuration in bucket seats (as opposed to one behind another on straddle seats) in an open-air seating area. Originally RUVs were two seat vehicles designed to carry a driver and a passenger sitting side-by-side. Examples of such an RUV are the BRP™ Commander™ family of side-by-side vehicles (which is generally described in United States Patent Application Publication (US 2011/0209937 A1), incorporated by reference in its entirety in those jurisdictions allowing for incorporations-by-reference) commercialized by Bombardier Recreational Products Inc. of Valcourt, Quebec, Canada; and the Polaris™ Ranger™ family of side-by-side vehicles commercialized by Polaris Industries Inc. of Medina, Minn., USA. These are but two examples of currently commercially available vehicles.

In the current conventional two-seater RUVs, the engine is either between the two seats (as in the case of the Commander vehicles) or rearward of the two seats (as in the case of the Ranger vehicles).

As RUVs have increased in popularity, manufacturers have sought to increase the passenger carrying capacity of these vehicles to be able to carry two additional passengers. One example of such a vehicle is the Polaris Ranger 4 family of vehicles. The way in which this vehicle appears to have been designed is to have taken a two seat RUV and to have stretched it in the center and included additional seats for the additional passengers. Thus, the engine in these vehicles is at the rear of the vehicle behind the rear seats (as it is with Polaris' two-seat Ranger vehicles). While this method of design is useful, practical and commonly used in vehicle design, it does not provide an optimal design of a four-seater RUV as it is simply a "stretched" two-seater.

Improved vehicle designs are therefore possible.

SUMMARY

It is an object of the present invention to ameliorate at least some of the inconveniences present in the prior art.

In one aspect, embodiments of the present invention provide a multi-passenger recreational utility vehicle comprising: A frame. At least two front wheels are suspended from the frame via a front suspension assembly. At least two rear wheels are suspended from the frame via a rear suspension assembly. An open-air seating area is located rearward of the at least two front wheels and forward of the at least two rear wheels. A front driver seat is within the seating area and is connected to the frame for accommodating a driver of the vehicle. The front driver seat is disposed on a driver-side of the vehicle. The front driver seat has a seat base and a backrest. A front passenger seat is within the seating area and is connected to the frame for accommodating a front passenger of the vehicle. The front passenger seat is disposed on a passenger-side of the vehicle and is laterally spaced apart from the front driver seat. The front passenger seat has a seat base and a backrest. A rear driver-side passenger seat is within the seating area and is connected to the frame for accommodating a rear driver-side passenger of the vehicle. The rear driver-side passenger seat is disposed on the driver-side of the vehicle and is longitudinally spaced apart from the front driver seat. The rear driver-side passenger has a seat base and a backrest. A rear passenger-side passenger seat is within the seating area and is connected to the frame for accommodating a rear passenger-side passenger of the vehicle. The rear passenger-side passenger seat is disposed on the passenger-side of the vehicle and is longitudinally spaced apart from the from passenger seat and is laterally spaced apart from the rear driver-side passenger side. The rear passenger-side passenger seat has a seat base and a backrest. A roll cage extends upwardly from the frame for assisting in protecting the seating area. A steering device is disposed within the steering area forward of the front driver seat and is connected to the frame. The steering device is operatively connected to the at least two front wheels for steering the vehicle. An engine is connected to the frame. A transmission operatively is connected to the engine and to at least one of the at least two front wheels and the at least two rear wheels. The transmission is for transmitting force from the engine to the at least one of the at least two front wheels and the at least two rear wheels for propelling the vehicle. A center console extends within the seating area intermediate the front driver seat and the front passenger seat and intermediate the rear driver-side seat and the rear passenger-side set. A first portion of the center console forms a storage compartment within the console. A storage compartment cover covers the storage compartment. The storage compartment cover forms a rear passenger armrest when covering the storage compartment. An inner accessory is inside the center console. The inner accessory is removable from the center console. The inner accessory is selectively openable.

In some embodiments at least a majority of the engine is: (a) longitudinally disposed forward of the backrests of the rear seats and rearward of the backrests of the front seats, and (b) laterally disposed between the driver-side seats the passenger-side seats. In some such embodiments a second portion of the center console forms an engine cover covering the engine. In some such embodiments the engine cover covers at least one cylinder head of the engine.

In some embodiments the engine has an output shaft, the output shaft being longitudinally forward of the backrests of the rear seats and rearward of the backrests of the front seats. In some such embodiments, the engine output shaft is located between a forward end and a rear end of one of the seat bases of one of the rear passenger seats. In some such embodiments, the transmission is a CVT having a drive pulley and a driven pulley, the driven pulley having a driven pulley axis, and the driven pulley axis being located between a forward end and a rear end of at least one of the seat bases of one of the rear passenger seats.

In some embodiments the transmission is a CVT, the CVT being located on one side of a longitudinal centerline of the vehicle, at least partially under one of the seats. In some such embodiments the CVT includes a drive pulley and a driven pulley, the driven pulley being located at least partially under one of the seat bases of one of the rear passenger seats.

In some embodiments the multi-passenger recreational utility vehicle further comprises a CVT cover and a storage space bounded by the CVT cover, an underside of one of the rear passenger seats, and a floor of the vehicle.

In some embodiments the multi-passenger recreational utility vehicle further comprises: a rear passenger-side grab handle extending from the center console forward of the rear passenger armrest; and a rear diver-side grab handle extending from the center console forward of the rear passenger armrest. In some such embodiments, the grab handles extend from the center console above the engine.

In some embodiments the center console extends longitudinally within the seating area from a front point forward of the front seats to a rear point at least even with the backrests of the rear seats.

In some embodiments the center console extends longitudinally within the seating area from a front dashboard to a rear point at least even with the backrests of the seats.

In some embodiments the seat base of the rear driver-side passenger seat has a seat frame and a seat cushion, the rear driver-side passenger seat being connected to the frame solely via a rear cantilevered connection of the seat base to upstanding frame members; and the seat base of the rear passenger-side passenger seat has a seat frame and a seat cushion, the rear passenger-side seat being connected to the frame solely via a rear cantilevered connection of the seat base to upstanding frame members. In some such embodiment the upstanding frame members are rearwardly angled.

In some embodiments the seat base of the rear driver-side passenger seat has a seat frame and a seat cushion, the rear driver-side passenger seat being connected to the frame solely via a braced rear cantilevered connection of the seat base to upstanding frame members; and the seat base of the rear passenger-side passenger seat has a seat frame and a seat cushion, the rear passenger-side seat being connected to the frame solely via a braced rear cantilevered connection of the seat base to upstanding frame members. In some such embodiments, the upstanding frame members are rearwardly angled.

In some embodiments the multi-passenger recreational vehicle further comprises at least one of: (a) a rear driver-side storage area under the rear driver-side passenger seat base; and (b) a rear passenger-side storage area under the rear passenger-side passenger seat base.

In some embodiments the multi-passenger recreational vehicle further comprises a transmission cover covering at least in part the transmission and extending under at least one of the rear driver-side passenger seat base and the rear passenger-side seat base. In some such embodiments, a footrest area is disposed laterally outwardly of the transmission cover.

In some embodiments the engine is disposed lower than the seat bases of the rear seats. In some such embodiments, the seat frames of the rear seats are disposed higher than the seat bases of the front seats. In some such embodiments a top of the engine is disposed higher than the seat bases of the front seats.

In some embodiments the multi-passenger recreational vehicle further comprises one of a cargo rack and a cargo box at the rear of the vehicle.

In some embodiments, the multi-passenger recreational vehicle further comprises a storage compartment at the front of the vehicle.

For purposes of the present application, terms related to spatial orientation when referring to a vehicle, such as, but not limited to, "forwardly", "rearward", "front", "rear", "above", "below", "left" and "right", are as they would be understood by a driver of the vehicle sitting in the vehicle in a normal driving position, with the vehicle in a straight ahead orientation (i.e. not steered left or right). Terms related to spatial orientation when referring to a component of the vehicle should be understood as they would be understood when the component is installed in the vehicle.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects and advantages of embodiments of the present invention will become apparent from the following description, the accompanying drawings and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
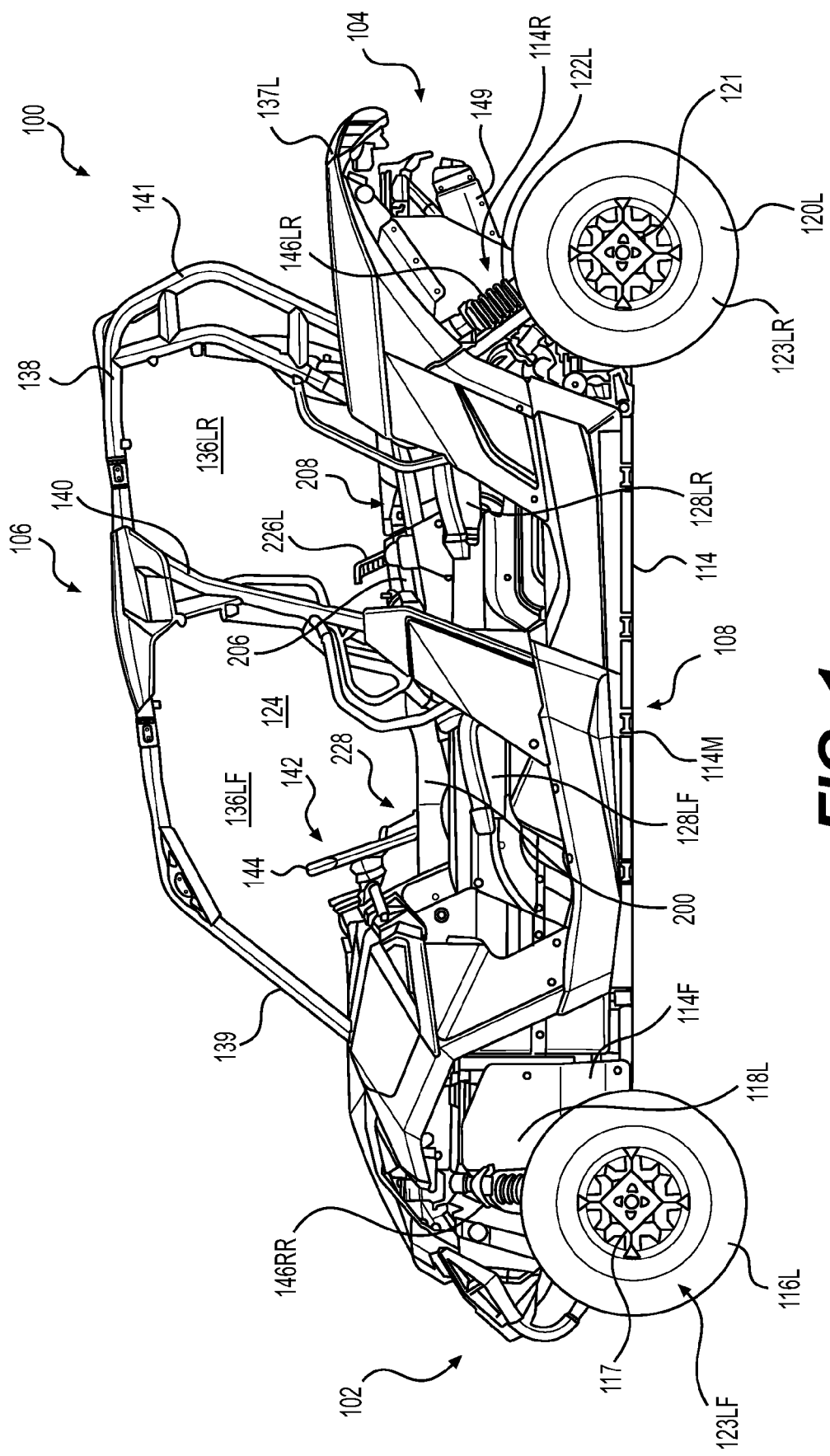
FIG. 1 is a left-side elevation view of a recreational utility vehicle being an embodiment of the present invention.

Referring to FIGS. 1 to 4, there is shown an embodiment of the present invention, RUV 100. RUV 100 has a front end 102, a rear end 104, a top 106, a bottom 108, a left side 110, and a right side 112. RUV 100 is a left-hand drive vehicle and thus RUV has a driver-side being the left side 112 of the vehicle, and a passenger-side being the right side 110 of the vehicle. (Other embodiments include right-hand drive vehicles and in such vehicles the right side of the vehicle would be the driver-side of the vehicle and the left side of the vehicle would be the passenger side of the vehicle.)

RUV 100 has a frame 114, which forms the backbone of the vehicle and to which all other vehicle components are connected (be it directly or indirectly). The frame 114 is comprised of a number of metallic elements fastened together via fasteners. The frame 114 has front portion 114F, a middle portion 114M, and a rear portion 114R. A pair of front wheels (left front wheel 116L, right front wheel 116R) is suspended from the front portion 114F of the frame 114 via front suspensions 118L/118R (respectively). The front wheels 116L/116R rotate about a front wheel axis 117. A pair of rear wheels (left rear wheel 120L, right rear wheel 120R) is suspended from the rear portion 114R of the frame 114 via rear suspensions 122L/122R (respectively). The rear wheels 120L/120R rotate about a rear wheel axis 121. (Other embodiments could include additional pairs of front and/or rear wheels.) Each wheel 116L/116R/120L/120R has a tire 123LF/123RF/123LR/123RR (respectively).

Figure 4:
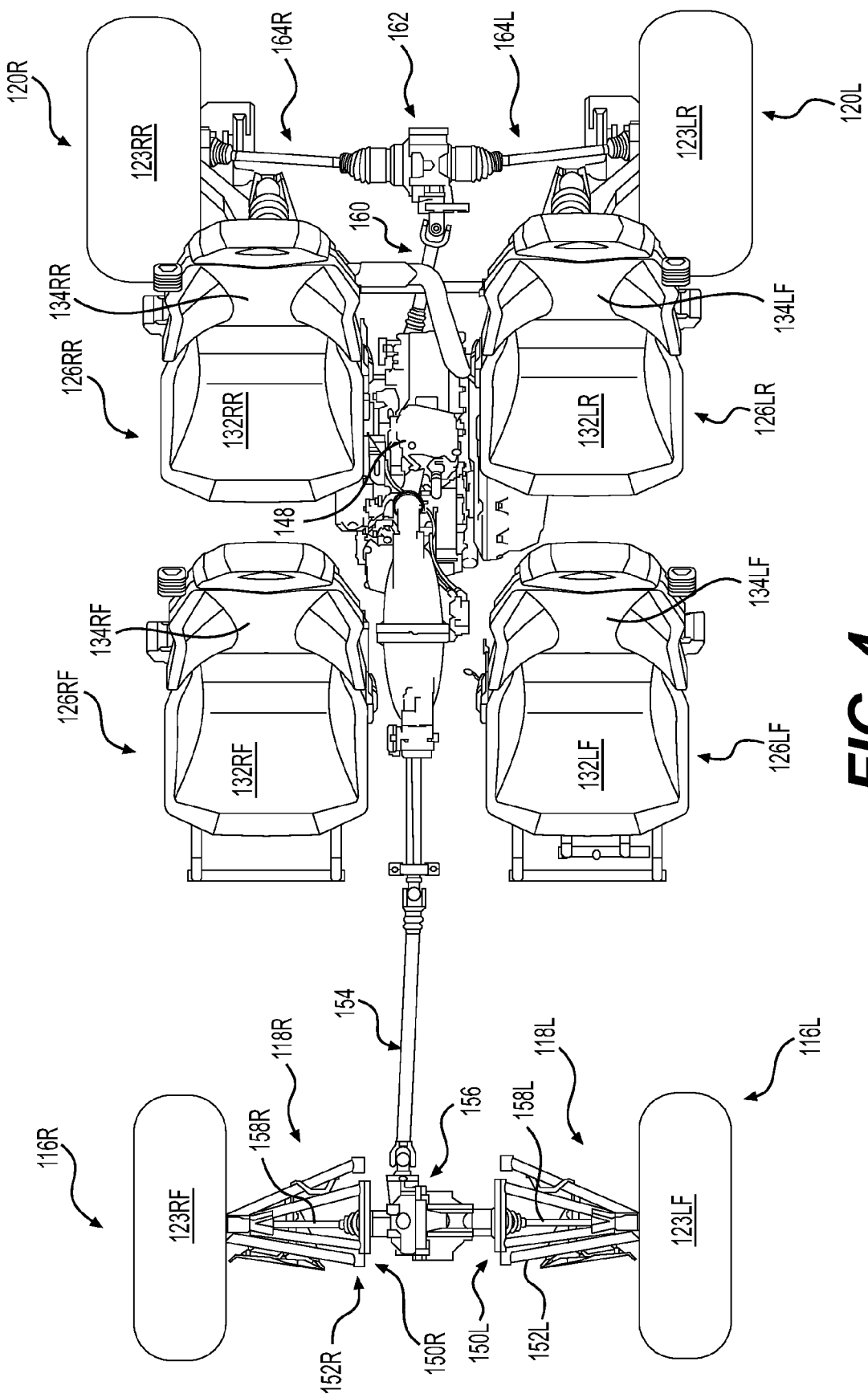
FIG. 4 is a top plan view of the vehicle in FIG. 1, with the frame, fairings and other components having been removed.

As can best be seen in FIG. 4, each front suspension 118L/118R includes lower 152L/152R and upper 150L/150R A-arms pivotally connected at one end to the front portion 114F of the frame 114, and at the other end to the corresponding front wheel 116L/116R (respectively). A shock absorber (146LF/146RF—as the case may be) is connected between the outer end of each upper A-arm 150L/150R and the front portion 114F of the frame 114. A sway bar (not shown), disposed rearward of the front suspensions 118L/118R, is connected to both upper A-arms 150L/150R to increase the roll stiffness of the front suspensions 118L/118R.

With reference to FIG. 1, each rear suspension 122L/122R includes lower and upper A-arms (not identified in the drawings) pivotally connected at one end to the rear portion 114R of the frame 114, and at the other end to the corresponding rear wheel 120L/120R. The upper A-arm of each rear suspension 122L/122R is pivotally connected by a linkage to a swing arm. The swing arm is disposed below the upper A-arm and is pivotally connected to the frame about an axis 196 that is forward of the A-arms. A shock absorber 146LR/146RR is connected between the outer end of each upper A-arm and the rear portion 114R of the frame 114. Toe links are pivotally connected at one end to the rear portion 114R of the frame 114, and at the other end to their corresponding rear wheel 120L/120R to maintain the rear wheels 120L/120R in a generally straight ahead orientation. The length of the toe links can be adjusted to give the rear wheels 120L/120R some toe in or some toe out.

An open-air seating area 124 is disposed in the middle portion 114M of the frame 114, rearward of the front wheels 116L/116R and forward of the rear wheels 120L/120R. Within the seating area 124 are four seats, a left (driver-side) front seat 126LF, a left (driver-side) rear seat 126LR, a right (passenger-side) front seat 126RF, and a right (passenger-side) rear seat 126RR. The front seats 126LF/126RF are laterally spaced apart from each another. The rear seats 126LR/126RR are laterally spaced apart from each other and are longitudinally spaced apart from the front seats 126LF/126RF. The seating area 124 is open at the two sides 110/112 forming four lateral passages 136LF/136RF/136LR/136RR through which the driver/passengers (as the case may be) can ingress and egress the RUV 110. Lateral covers (not shown) may be disposed across the lateral passages 136LF/136RF/136LR/136RR to selectively cover the lateral passages for ingress or egress of the riders.

Figure 2:
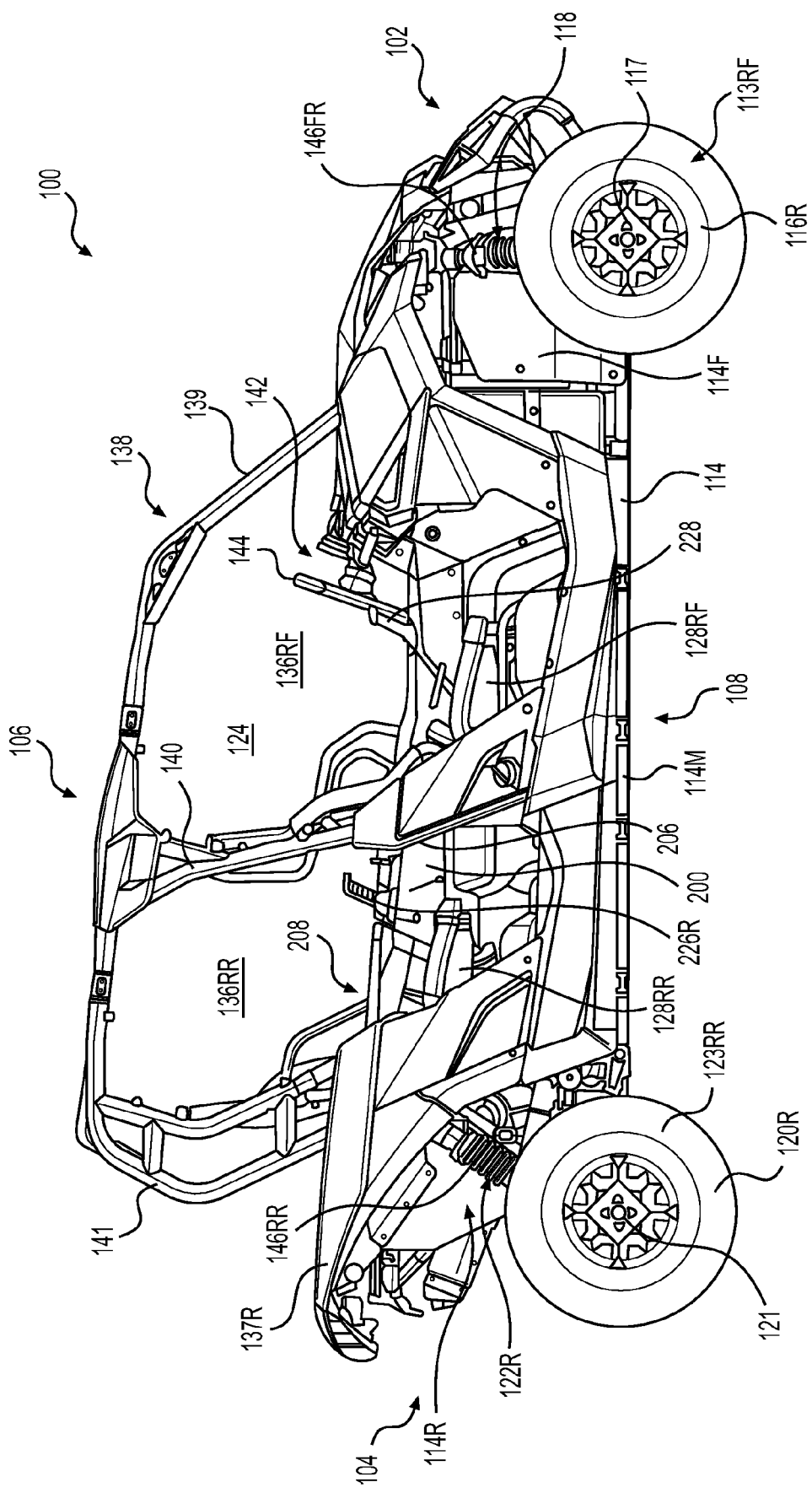
FIG. 2 is a right-side elevation view of the vehicle in FIG. 1.
Figure 12:
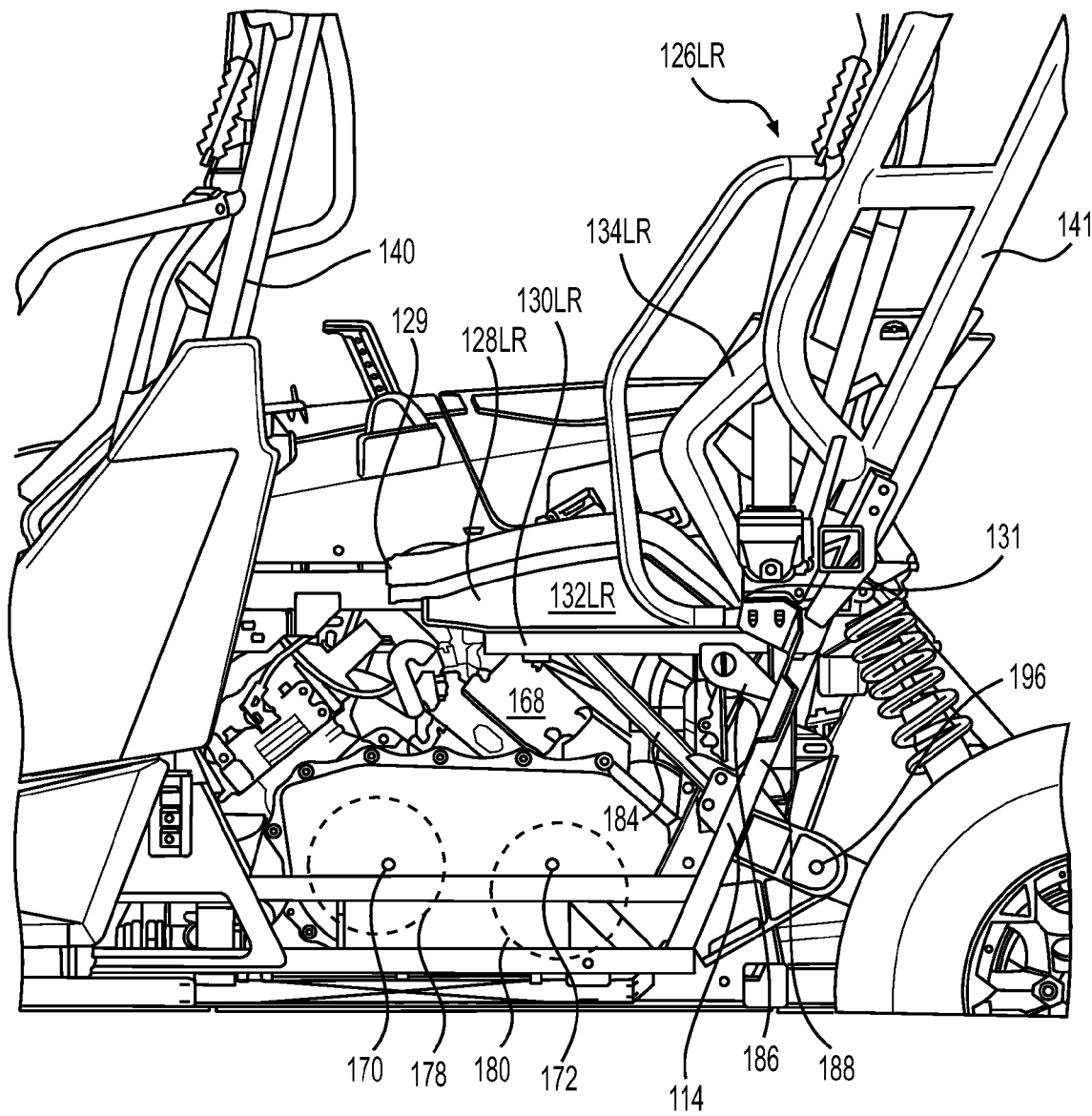
FIG. 12 is a close-up left side elevation view of the left rear seat portion of the vehicle of FIG. 1.
Figure 13:
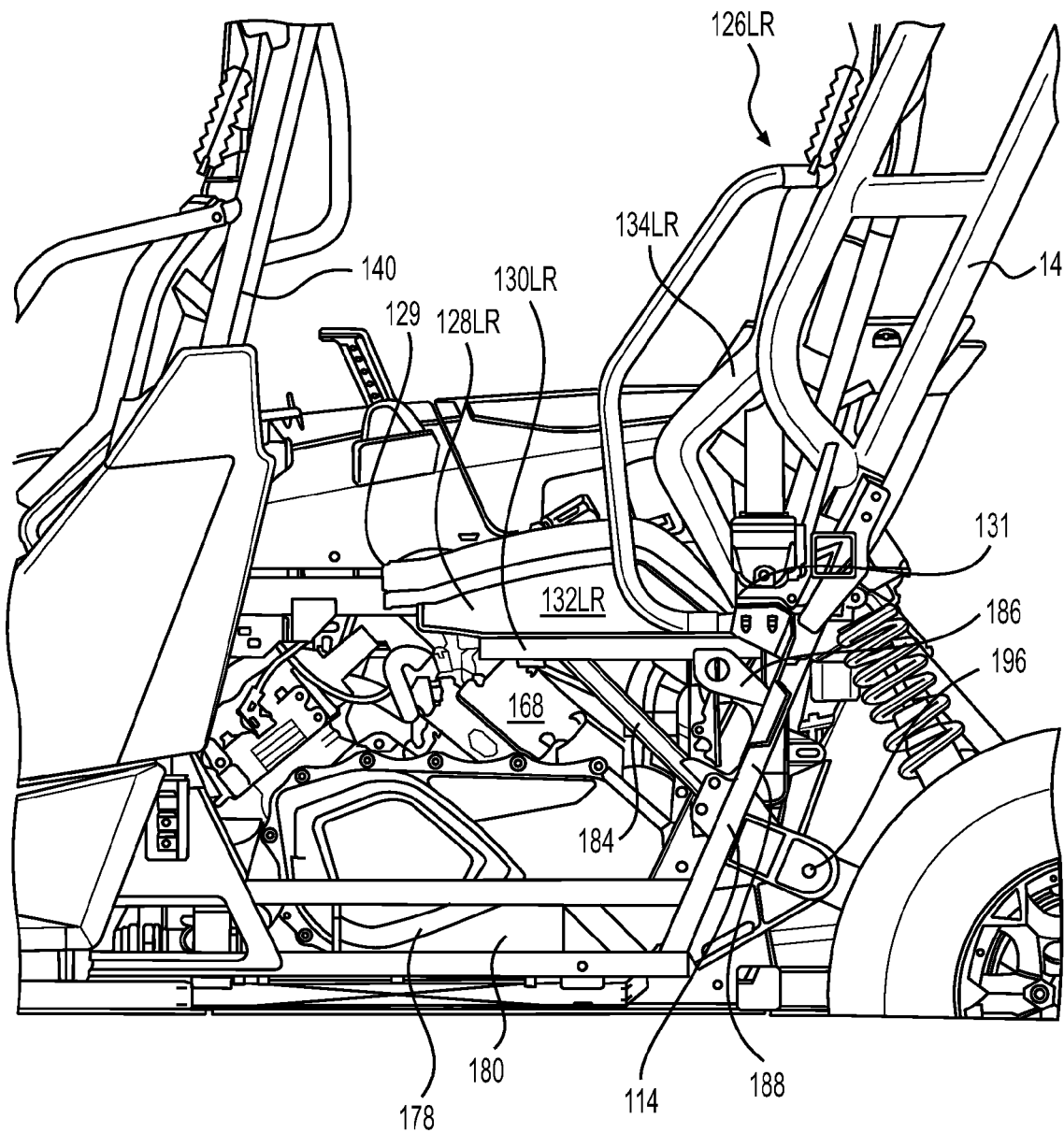
FIG. 13 is a close-up left side elevation view of the left rear seat portion of the vehicle of FIG. 1.

Each of the seats 126LF/126RF/126LR/126RR is a bucket seat. Each of the seats 126LF/126RF/126LR/126RR has a seat base 128LF/128RF/128LR/128RR (respectively) having a seat frame 130LF/130RF/130LR/130RR (respectively) and a seat cushion 132LF/132RF/132LR/132RR (respectively), and a backrest 134LF/134RF/134LR/134RR (respectively). As can be seen in FIGS. 1 and 2, in this embodiment, the seat bases 128LR/128RR, frames 130LR/130RR, and cushions 132LR/132RR of the rear seats 126LR/126RR are disposed vertically higher than the seat bases 128LF/128RF, frames 130LF/130RF, and cushions 132LF/132F of the front seats 126LF/126RF. As can be seen in FIG. 12, (showing left rear seat 126LR as an example), the seat base 130LR of left rear seat 126LR is attached to an upstanding rearwardly angled member 188 of vehicle frame 114 (rather than to a horizontal frame member as is conventionally the case). Further two angled brace members 184, 186 connect the seat base 130LR with the vertical frame member 188. (The construction of the right rear seat 126RR is similar and will not be described herein.) Having the seat base 130LR connected to the frame 114 provides for additional space under the seat 126LR, which may be used for, e.g. storage or placement of vehicle components.

A roll cage 138 is connected to the frame 114 and is disposed above the open-air seating area 124. The roll cage 138 is an arrangement of metal tubes that contributes to protecting the riders in the event the vehicle 100 rolls over. The roll cage 138 has several attachment points to the frame 114. Toward the front of the RUV 100, the roll cage 138 (specifically forward members 139 thereof) connects to the front portion 114F of frame 114 at front attachment points (not shown in drawing). The front attachment points are located longitudinally between a roll axis of the front wheels 116L/116R and a foremost point of the front seats 126LF/126RF. Toward the rear of the RUV 100, the roll cage 138 (specifically rearward members 141 thereof) connects to the rear portion 114R of frame 114 at rear attachment points (not shown in drawings). The rear attachment points are located longitudinally between the axis 121 of the rear wheels 120L/120R and the rear seats 126LR/126RR. The roll cage 138 further includes a pair of intermediate lateral members 140, one on each side of a rear part of the roll cage 138. The intermediate lateral members 140 connected to the middle portion 114M of the frame 114 on each side of the vehicle.

A steering device 142 including a steering wheel 144 is disposed in front of the left front seat 126LF. (As was discussed above, it is contemplated that, the steering wheel 144 could be disposed in front of the right front seat 126RF in other embodiments.) The steering device 142 is operatively connected to the two front wheels 116L/116R in a conventional manner to permit steering of the RUV 100.

A cargo rack 138 is mounted to the RUV rearwardly of the rear seats 126LR/126RR. Cargo rack 138 is partially surrounded by left and right fairings 137L/137R. An opening 105 between rear ends of the fairings 137L and 137R enables easy access to the cargo rack 138. The rear ends of the fairing 137L and 137R hold running lights 143L and 143R. Best seen in FIG. 1, cargo rack 138 is positioned above a rearward facing muffler 149. It is contemplated that the cargo rack 138 could be omitted. It is also contemplated that a pivotable cargo box could be present.

To drive the front wheels 116L/116R, an engine 148 (described in further detail below) is connected to a front driveshaft 154, which is in turn connected to a front differential 156. The front differential 156 transfers the torque from the front driveshaft 154 to left and right half-shafts 158L/158R (respectively). The half-shafts 158L/158R are connected to their respective front wheels 116L/116R. Similarly, to drive the rear wheels 120L/120R, the engine 148 is connected to a rear driveshaft 160, which is in turn connected to a rear differential 162. The rear differential 162 transfers the torque from the rear driveshaft 160 to left and right half-shafts 164L/164R (respectively). The half-shafts 164L/164R are connected to their respective rear wheels 120L/120R.

As can best be seen in FIG. 4, an engine 148 is mounted to the frame 114 (attachment points not shown). The engine 148 is operatively connected to the four wheels 116L/116R/120L/120R to power the RUV 100 as described above. (It is contemplated that in other embodiments the engine 148 could be operatively connected only to the front wheels 116L/116R or only to the rear wheels 120L/120R or could selectively switch between driving two and four wheels.) The engine 148 is a four-stroke V-twin engine. Accordingly, the engine 148 has two cylinders 166 extending at an angle from each other. Each cylinder has a cylinder head 168 (as would be understood by those skilled in the art). (It is contemplated that in other embodiments other types of engines could be used. For example, the engine could be a two-stroke engine with in-line cylinders.)

Figure 16:
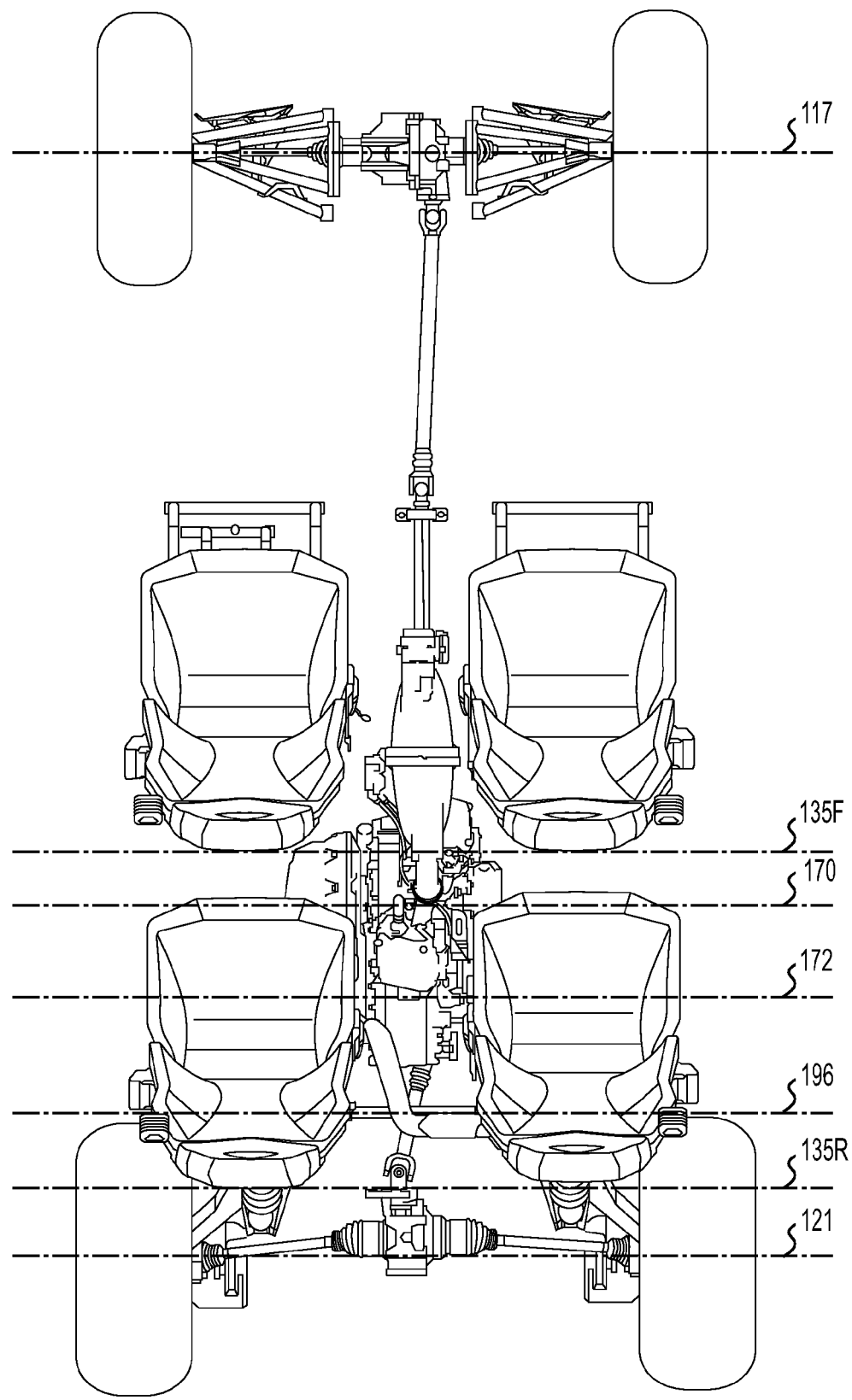
FIG. 16 is a top plan view of the vehicle in FIG. 1, with the frame, fairings and other components having been removed, similar to FIG. 4.

The engine 148 is disposed within an imaginary rectangular box such that the majority of the engine is rearward of the seatbacks 134LF/134RF of the front seats 126LF/126RF, forward of the seat backs 134LR/134RR of the rear seats 126LR/126RR and between the left rear seat 126LR and the right rear seat 126RR. Preferably the entirety of the engine (excluding its associated systems—e.g. intake system, exhaust system) is rearward of the seatbacks 134LR/134RR if the front seats 126LF/126RF and forward of the seat backs 134LR/134RR of the rear seats 126LR/126RR. Similarly, a majority of the engine 148 is located between the intermediate member 140 of the roll cage 138 and the rearward member 141 of the roll cage 138. Preferably, the entirety of the engine 148 is located between the intermediate member 140 of the roll cage 138 and the rearward member 141 of the roll cage 138. Similarly, a majority of the engine 148 is located forward of the rear suspension axis 196. It is preferred that the entirety of the engine 148 be located forward of the rear suspension axis 196. Thus, referring to FIG. 16, when viewed from above, starting at the front of the vehicle 100 and moving towards the rear of the vehicle 100, there is first the front wheel axis 117, the rearward most portion 135F of the seatbacks 134LF/134RF of the front seats 126LF/126RF, the engine output shaft axis (CVT drive pulley axis) 170 (see below), the CVT driven pulley axis 172 (see below), the rear suspension axis 196, the rearward most portion 135R of the seatbacks 134LR/134RR of the rear seats 126LR/126RR, and finally the rear wheel axis 121.

The engine 148 is generally disposed along the longitudinal centerline 198 of the vehicle 100 intermediate the left 126LF/126LR and right seats 126RF/126RR of the vehicle 100. The engine 148 is also disposed vertically lower than the top of the seat base 128LR of the left rear seat 126LR, preferably with the highest portion of the cylinder heads 168 being approximately vertically level with the seat frame 130LR of the left rear seat 126LR. Thus, the highest portion of the cylinder heads 168 is vertically higher than the seat frame 130LF of the left front seat 126LF.

Figure 15:
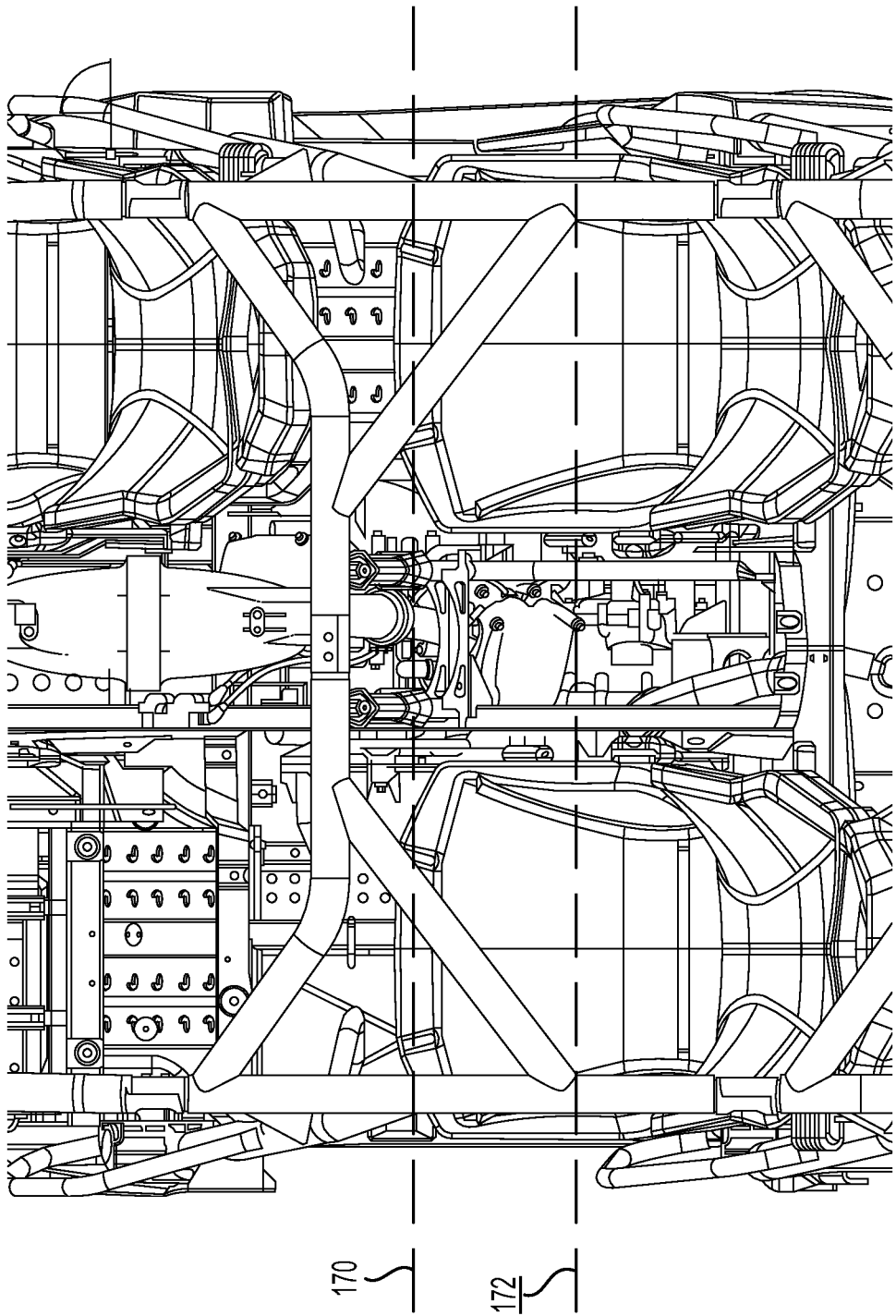
FIG. 15 is a top plan view of the rear seat portion of the vehicle of FIG. 1 similar to FIG. 14.

The engine has a output shaft 170 extending therefrom that is driven directly or via transmission means, such as gears, by a crankshaft (not shown) of the engine 148. The engine output shaft 170 is located longitudinally between the forward end 129 and the rear end 131 of the seat base 128LR of the left rear seat 126LR (see FIG. 15). (It should be understood that embodiments where this configuration is present under the right rear seat 126RR are also possible.)

The output shaft 170 drives a driven shaft 172 via a CVT 174. The CVT 174 is disposed on a left side of the longitudinal centerline 198 of the vehicle 100 (in this embodiment). The CVT 174 includes a drive pulley 178 disposed on the drive shaft 172 for rotation therewith, a driven pulley 180 disposed on the driven shaft 172 for rotation therewith, and a CVT belt 182 disposed around both pulleys 178/180 to transmit the rotation of the drive pulley 178 to the driven pulley 180. Each one of the pulleys 178/180 includes a beveled movable sheave that can move axially relative to a beveled fixed sheave in response to changes in rotational speed and torque to modify an effective diameter of the corresponding pulley thereby modifying a transmission ratio from the drive pulley 178 to the driven pulley 180. The driven shaft 172 drives a transmission (not shown). The transmission is connected to the back of the engine 148. The cover 184 is disposed over the CVT 174 and is connected to both the engine 148 and the transmission. The transmission transfers the torque from the driven shaft 172, which extends transversely to the longitudinal centerline 198, to front and rear driveshaft 154/160 (respectively), which extend generally parallel to the centerline It is contemplated that in other embodiments the transmission could also vary the speed of rotation from the driven shaft to the driveshafts 154/160.

Figure 14:
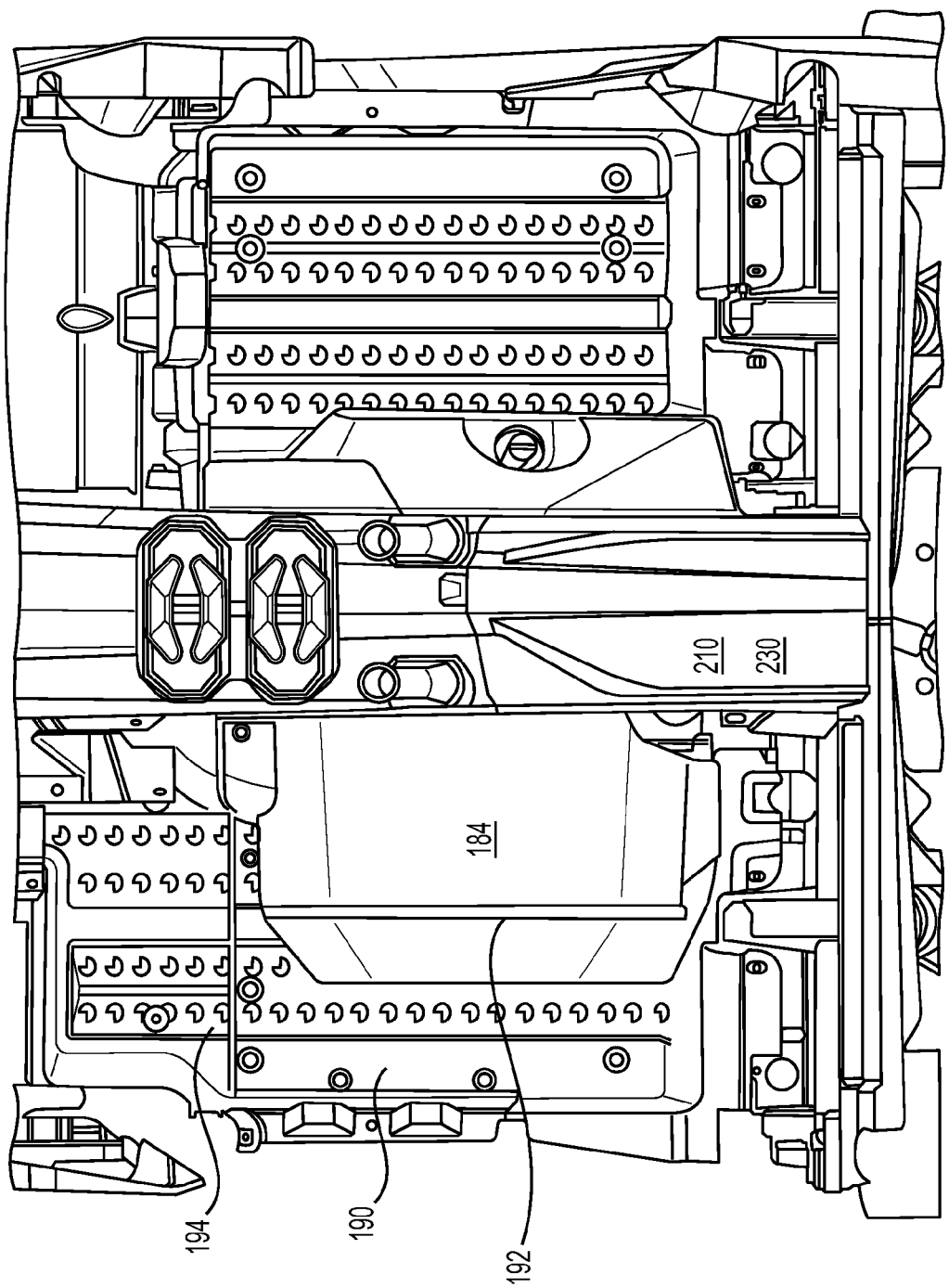
FIG. 14 is a top plan view of the rear seat portion of the vehicle of FIG. 1 with the rear seats and roll cage having been removed.

In this embodiment, the CVT 174 is located on the left side of the longitudinal centerline 198 of the vehicle 100, with a part thereof being located under the seat base 128LR of the left rear sear 126LR. In particular, the driven pulley 180 is located almost entirely underneath the seat base 128LR of the left rear seat 126LR, with the driven pulley axis 172 being located longitudinally between the forward end 129 and the rearward end 131 of the seat base 128LR of the left rear seat 126LR. As can best be seen in FIG. 14, a storage space 192 is formed underneath the seat base 128LR bounded by the underside of the seat base 128LR, the CVT cover 184 and the floor 190 of the vehicle 100. A footrest area 194 is formed on the floor 190 of the vehicle 100 laterally outward of and forward of the CVT cover 184. (Similarly, although not shown, a storage space is formed underneath the seat base 128RR of the rear right seat 126RR bounded by the underside of the seat base 128RR and the floor 190 of the vehicle 100.)

Fuel to be supplied to the engine is stored in a fuel tank. The fuel tank is mounted to the frame.

Figure 5:
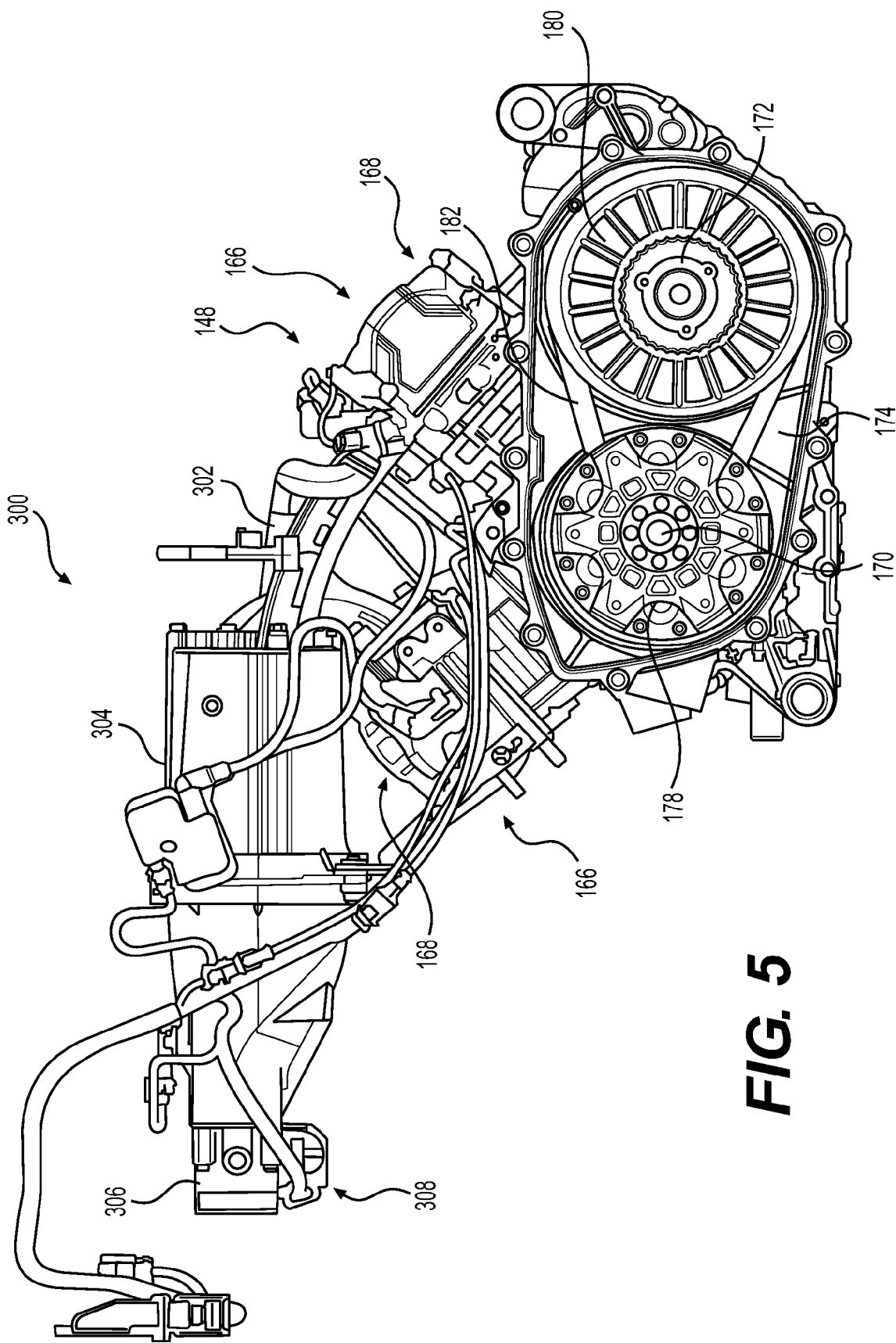
FIG. 5 is a left side elevation view of the engine and some related systems of the vehicle of FIG. 1.
Figure 6:
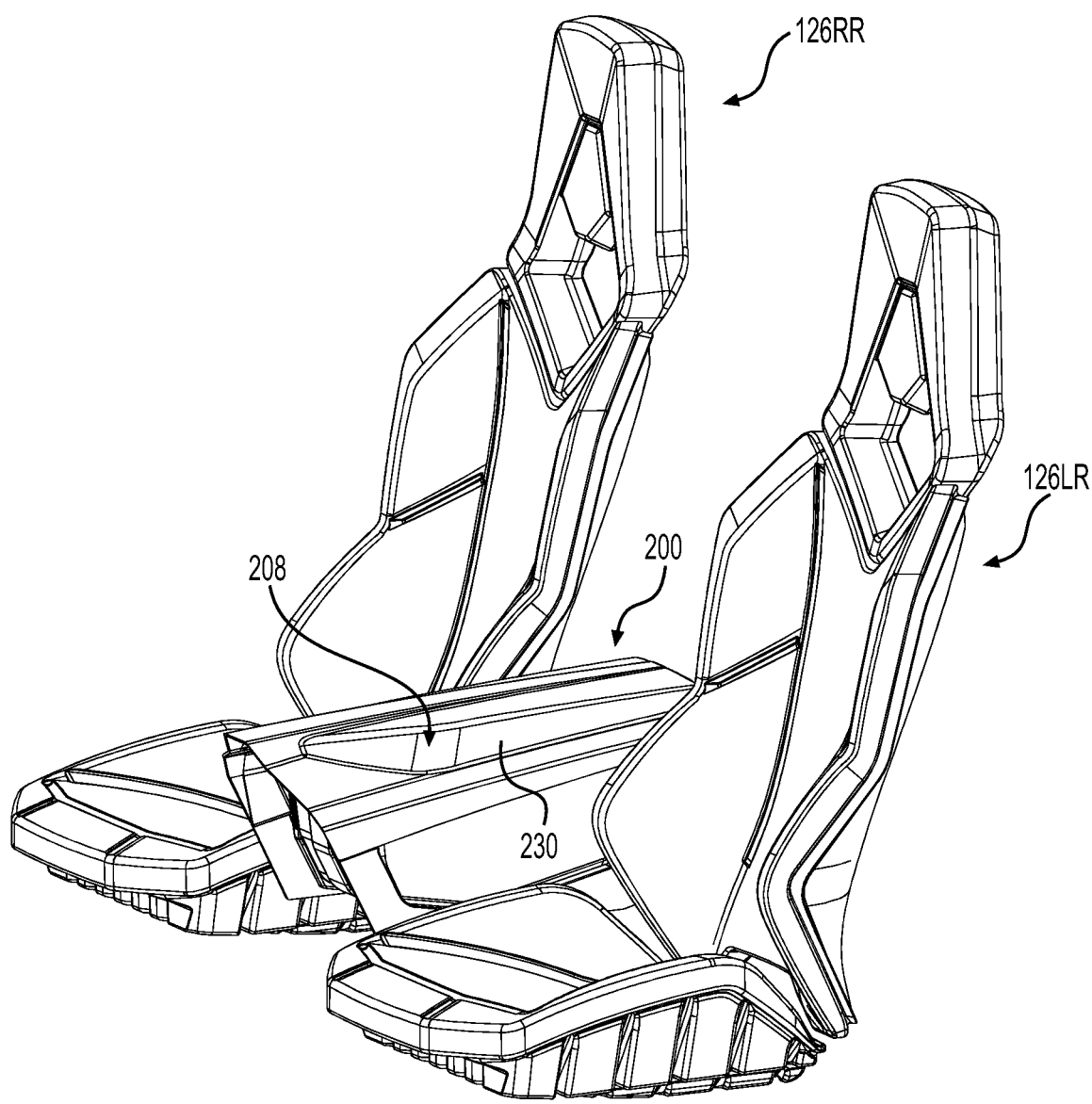
FIG. 6 is left front perspective view of the rear seats and a portion of the center console of the vehicle of FIG. 1, with the storage compartment cover of the console closed.
Figure 7:
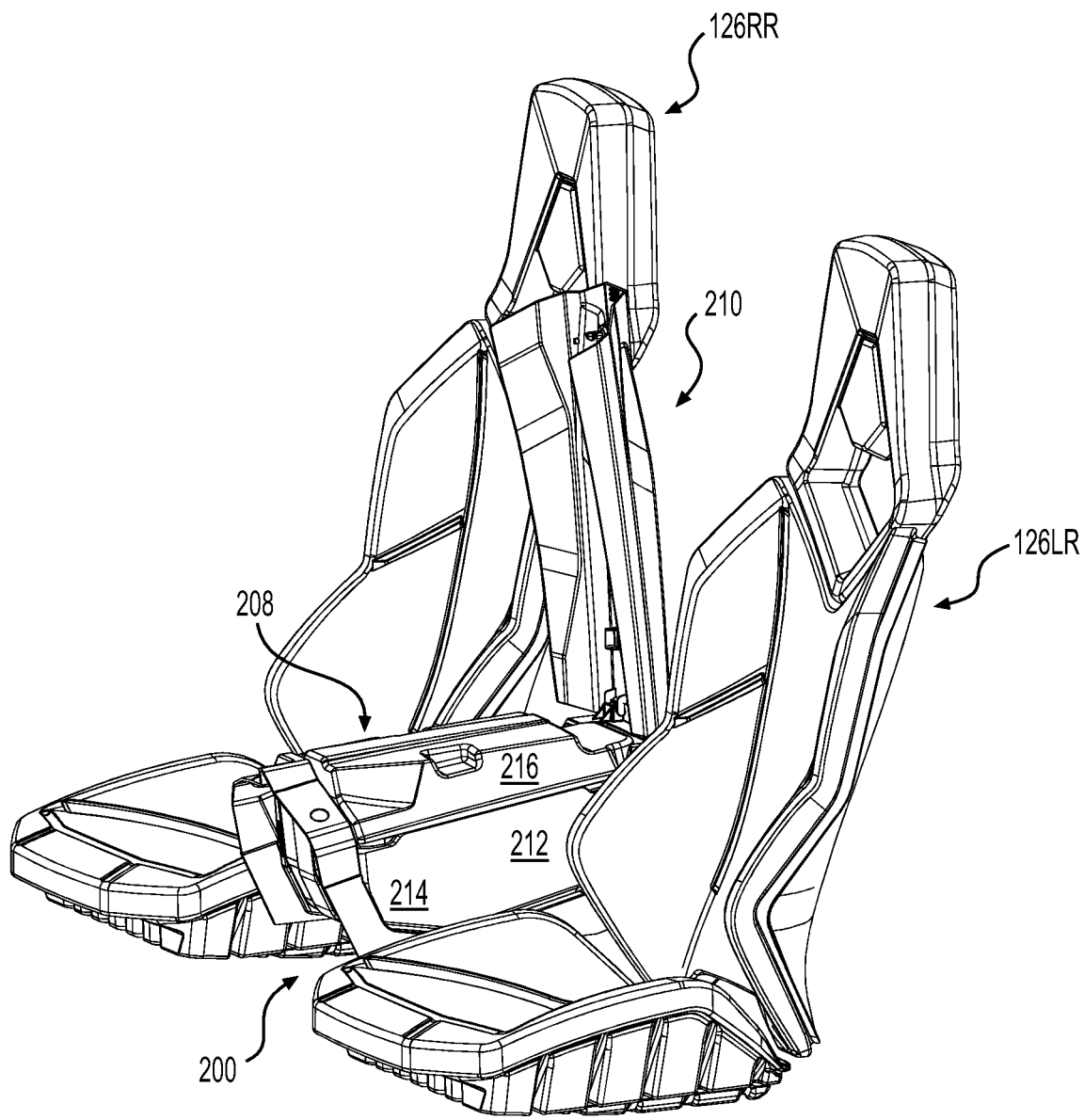
FIG. 7 is left front perspective view of the rear seats and a portion of the center console of the vehicle of FIG. 1, similar to FIG. 6 with the storage compartment cover of the console open.

As can be seen in FIGS. 4 & 5, air is supplied to the engine via air induction system 300. The air induction system 300 includes an intake manifold 302 connected to both cylinders 166, an intake conduit 304 connected upstream of the intake manifold 302, a throttle body 306 connected upstream of the intake conduit 304, an intake conduit (not shown) connected upstream of the throttle body 306, an air box (not shown) connected upstream of the intake conduit, and a right-angle intake conduit (not shown) connected upstream of the air box. When the engine is operating, air flows consecutively through the right-angle conduit, the air box, the intake conduit, the throttle body, the intake conduit, the intake manifold and then enter the air intake ports of the cylinders of the engine. The air box, the intake conduit, the throttle body, and the intake conduit are arranged in-line such that a longitudinal centerline 198 of the vehicle extends generally through these elements and that the longitudinal axes of these elements are parallel to (yet in this embodiment slightly offset from) to the longitudinal centerline. Furthermore, the intake conduit, the throttle body, and the intake conduit are generally disposed laterally between the left side sets 126LF/126RF and the right side seats 126LR/126RR.

As can be seen, the throttle body 306 is disposed forwardly and vertically higher than the engine 148. The throttle body 306 includes a throttle plate that is positioned to regulate a flow of air to the element of the air induction system disposed downstream thereof and to the engine 148. An electric motor 308 is mounted to a right side of the throttle body 306 on a right side of the longitudinal centerline 198 of the vehicle 100. The electric motor 308 is disposed inside the cooling tunnel defined by the console 200. The electric motor 308 is also disposed forwardly and vertically higher than the engine 148. The electric motor 308 is operatively connected to the throttle plate to pivot the throttle plate inside the throttle body 306. The electric motor 308 positions the throttle plate based at least in part on a position of a throttle pedal (not identified) of the vehicle 100. The throttle pedal is located in front of the left front seat 126LF, above a floor 190 of the open-air seating area, below the steering device 144. The throttle pedal is pivotally connected to a bracket. A throttle pedal position sensor (not shown) is mounted to the bracket and is connected to a pivot shaft of the throttle pedal located forwardly of the throttle pedal. As such, the throttle pedal position sensor is disposed forwardly of the electric motor. The throttle pedal position sensor senses a position of the throttle pedal and sends a throttle pedal position signal representative of this position to a control unit. Based at least in part on the throttle pedal position signal, the control unit sends a signal to the electric motor 308 to adjust an opening of the throttle plate of the throttle body 306.

An exhaust system (not shown) delivers the exhaust gases from the engine 148 to the atmosphere. The exhaust system includes exhaust pipes, an exhaust manifold, and a muffler. The exhaust pipe is connected to an exhaust port of the front cylinder of the engine on a right side of the centerline. The exhaust pipe is connected to an exhaust port of the rear cylinder of the engine on a right side of the centerline. From this exhaust port, the exhaust pipe extends generally rearwardly and then bends toward the right to connect to another inlet of the exhaust manifold. The exhaust manifold extends generally perpendicularly to the centerline and extends away therefrom toward a right of the vehicle. The exhaust manifold connects to the exhaust pipe. From the exhaust manifold, the exhaust pipe extends generally parallel to the centerline toward a rear of the vehicle and then turns toward the centerline to connect to the muffler. The muffler extends generally perpendicularly to the centerline. When the engine is operating, exhaust gases from the exhaust ports of the cylinders flow consecutively through their respective exhaust pipes, and the exhaust manifold which combines the flows into a single flow in the exhaust pipe. From the exhaust pipe, the exhaust gases flow through the muffler and are then released to the atmosphere.

Elements of a control system of the RUV will be described. The sensors/switches and have already been described above and will therefore not be described again below.

The RUV has a vehicle speed sensor (now shown). The vehicle speed sensor senses a speed of rotation of the driven shaft. The vehicle speed sensor transmits a vehicle speed signal based on the speed of rotation of the driven shaft to the control unit. By knowing the diameter of the wheels and, if applicable, a transfer ratio of the transmission, the control unit can determine a speed of the vehicle. It is contemplated that the vehicle speed sensor could sense a speed of any shaft driven by the driven pulley 180 (i.e. any shaft connected between the driven pulley and one of the wheels), including shafts inside the transmission, to determine the speed of the vehicle.

The RUV also has an engine speed sensor (not shown). The engine speed sensor senses engine speed of the engine by sensing the speed of rotation of a rotating shaft of the engine, such as the crankshaft or camshaft (not shown), or of the output shaft 170. The engine speed sensor transmits an engine speed signal based on this speed of rotation to the control unit.

Based at least in part on the signals received from the switches/sensors, the control unit controls an operation of the engine. To control the operation of the engine, the control unit sends a signal to the electric motor to control a position of the throttle plate in the throttle body, sends another signal to the spark plugs to control ignition timing, and sends another signal to the fuel injectors to control fuel injection.

Also based on the signals received from the switches/sensors, the control unit controls a display of information on one or more display gauges disposed in front of the driver seat above the steering device. From the signals from the sensors, the gauges display engine and vehicle speed. From the signal from the switch/sensor the gauges displays an icon or message when the driver safety belt is not fastened. It is contemplated that not all of the above could be displayed on the gauges.

It is contemplated that the control unit could be separated into multiple units each having one or more of the functions described above and further below.

A center console 200 extends centrally along the longitudinal centerline 198 within the open-seating area 124 of the RUV intermediate the left front seat 126LF and the right front seat 126RF and intermediate the left rear seat 126LR and the right rear seat 126RR. In this embodiment the center console 200 extends longitudinally through the entire open-air seating area 124, from the front dashboard 202 to the rear bulkhead 204 of the vehicle 100. (In other embodiments it is contemplated that the center console need not extend longitudinally through the entire open-air seating area but rather could terminate short of the front dashboard (preferably at point forward of the front seats 126LF/126RF) and or short of the rear bulkhead (preferably at a point rearwards of the backrests of the rear seats 126LR/126RR). In this embodiment a portion 206 of the center console 200 thus covers the cylinder heads 168 of the engine as well as the engine's air intake system.

Starting at and continuing rearward from the portion 206 of the center console 200 covering the cylinder heads 168 of the engine 148, and intermediate the left rear seat 126LR and the left front seat 126LF, is there is disposed in the center console 200 a storage compartment 208.

Referring to FIGS. 6 to 11, the storage compartment 208 of the center console 200 is shown in greater detail. In this embodiment the storage compartment 208 has a storage compartment cover 210. The storage compartment cover 210 is movable between a closed position (rendering the storage compartment 208 inaccessible) and an open position (rendering the storage compartment 208 accessible). In this embodiment the storage compartment cover 210 is pivotably attached to the center console 200 (rearward of the storage compartment 208) and pivots between the closed position and the open position. (It is contemplated that in other embodiments the storage compartment cover 210 could be removable from the center console 200 and/or could move in a different manner.) The storage compartment cover 210 is retained in its closed position via a latch (not shown). A top portion of the storage compartment cover forms an armrest 230 accessible to passengers sitting in the rear passenger seats (126RL/126RR).

Figure 9:
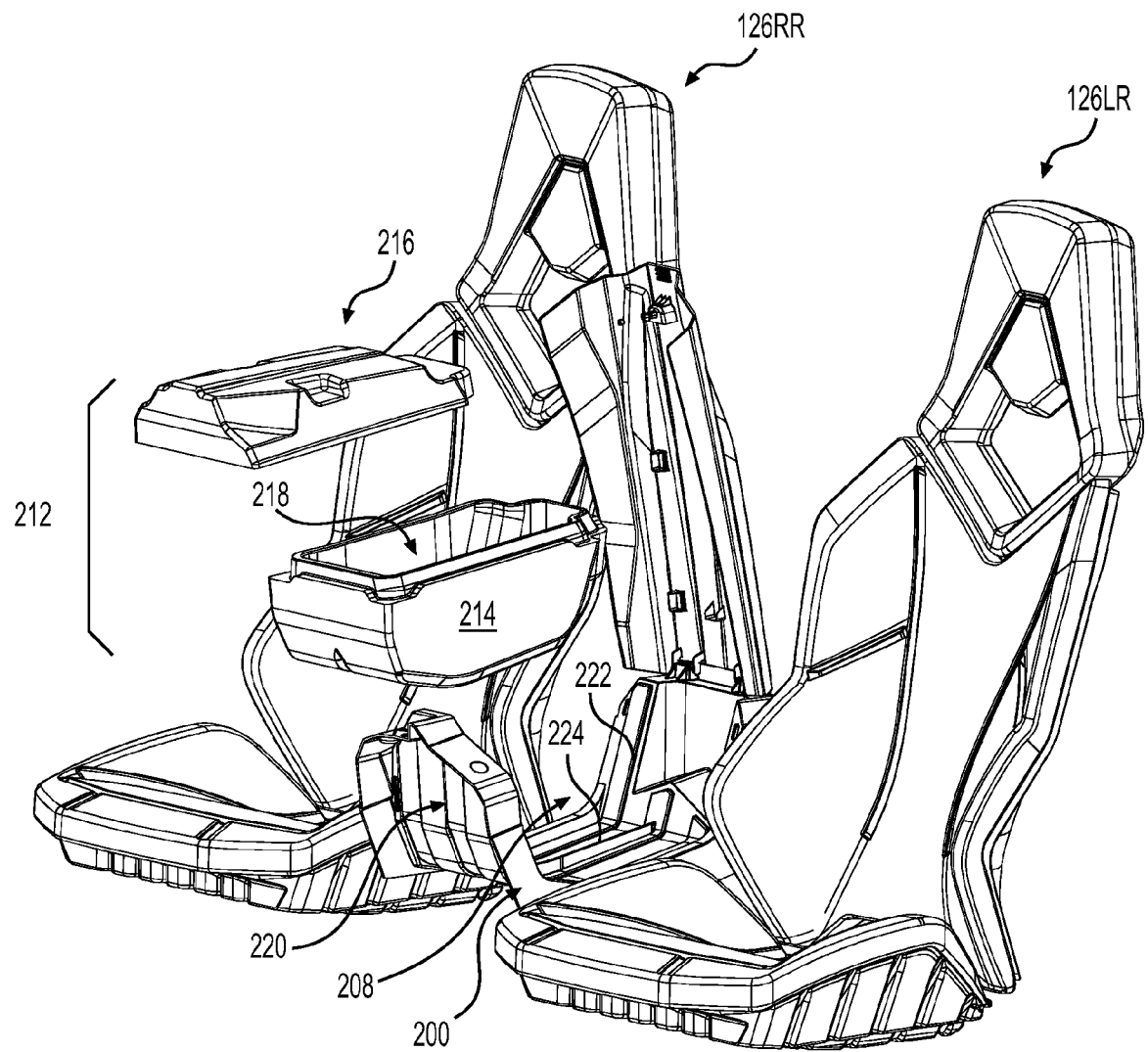
FIG. 9 is left front perspective view of the rear seats and a portion of the center console of the vehicle of FIG. 1, similar to FIG. 8 with the storage compartment cover of the console open and the top portion of the storage bin having been removed from the bottom portion, and the entirety of the bin having been removed from the console.
Figure 10:
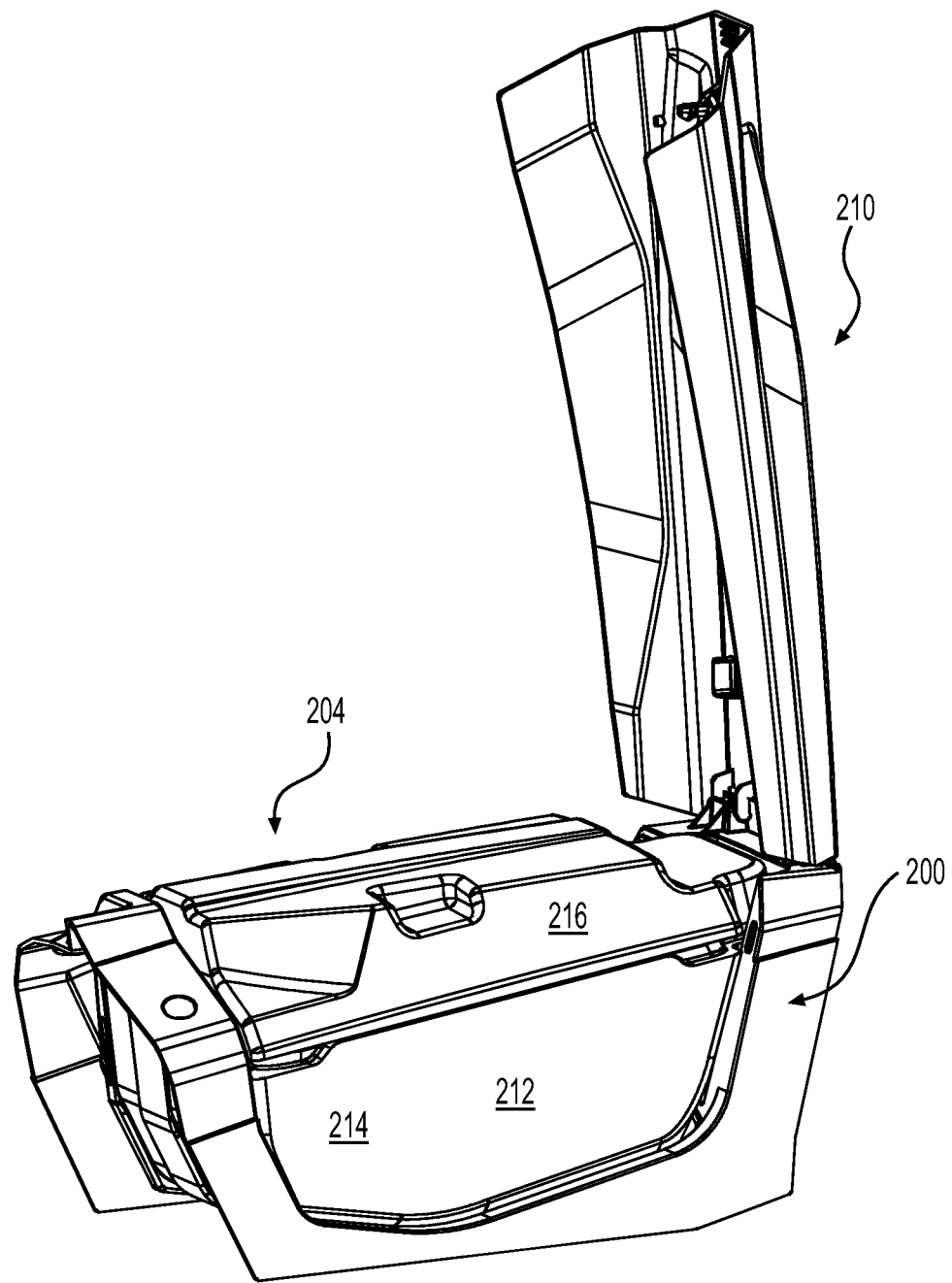
FIG. 10 is a front left perspective view of the storage compartment in the center console with the storage compartment cover open, with the storage bin being retained within the storage compartment.
Figure 11:
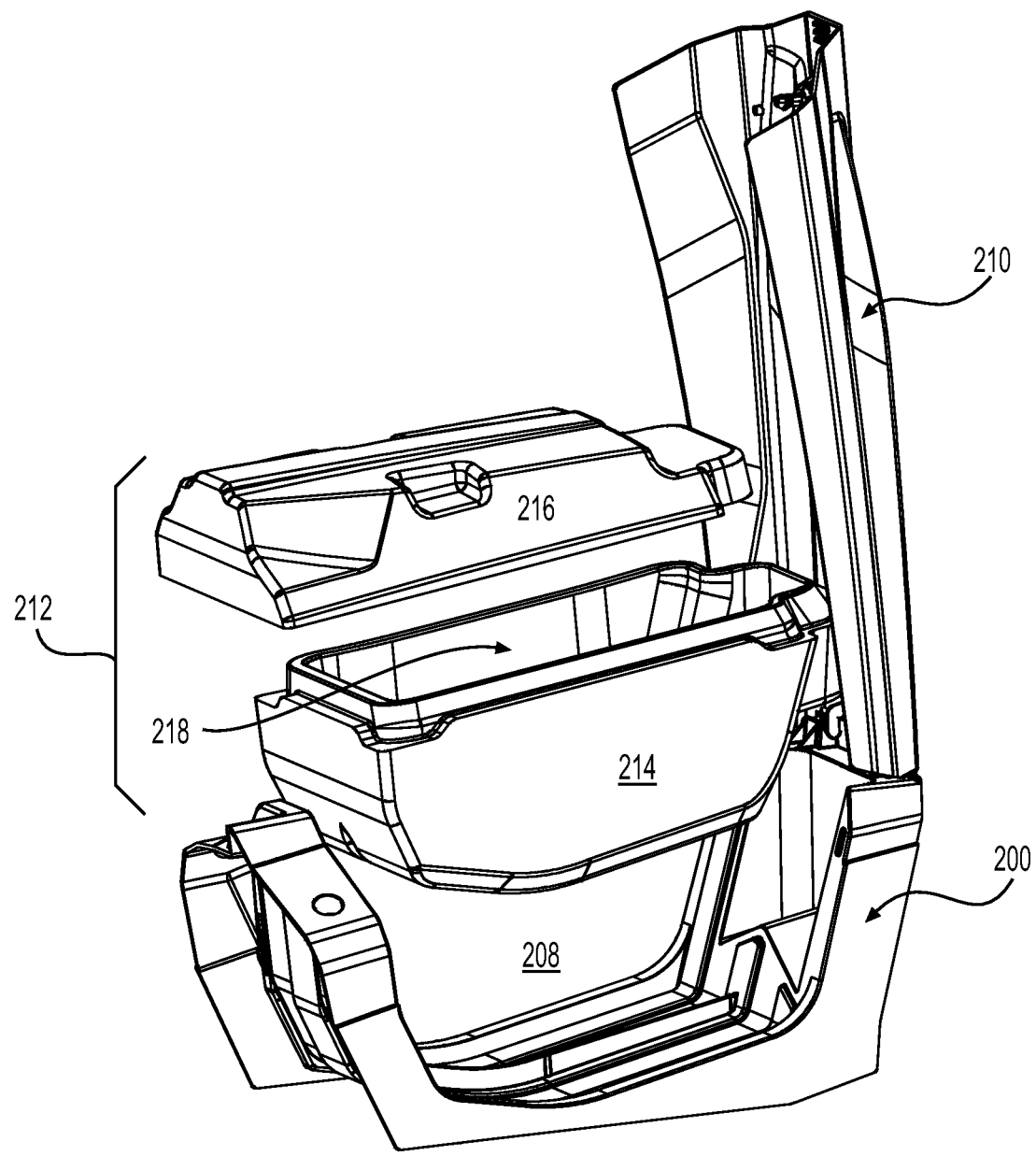
FIG. 11 is a front left perspective view of the storage compartment in the center console with the storage compartment cover open, similar to FIG. 10, with the storage bin having been removed from the storage compartment, shown with the top portion apart from the bottom portion.

Referring specifically to FIG. 9, in this embodiment the storage compartment 208 (formed within the center console 200) is not bounded by solid walls on every side. In this embodiment the storage compartment is formed by a front wall 220, a rear wall 222, and a bottom wall 224 (i.e. there are no side walls—the sides of the storage compartment being open to the environment. (It is contemplated that in other embodiments side walls could be present and thus a closed storage compartment would be formed.)

In this embodiment, within the storage compartment 208 is an inner accessory—a storage bin 212. The storage bin 212 is sized and structured to be positionable within the storage compartment 208 when the storage compartment cover 210 is open (see FIG. 7) and to be retained within the storage compartment 208 when the storage compartment cover is closed 212 (see FIG. 6). An appropriate fastener (not shown) may optionally secure the storage bin 212 within the storage compartment 210. The storage bin 212 is removable from the storage compartment 208 in this embodiment.

Figure 8:
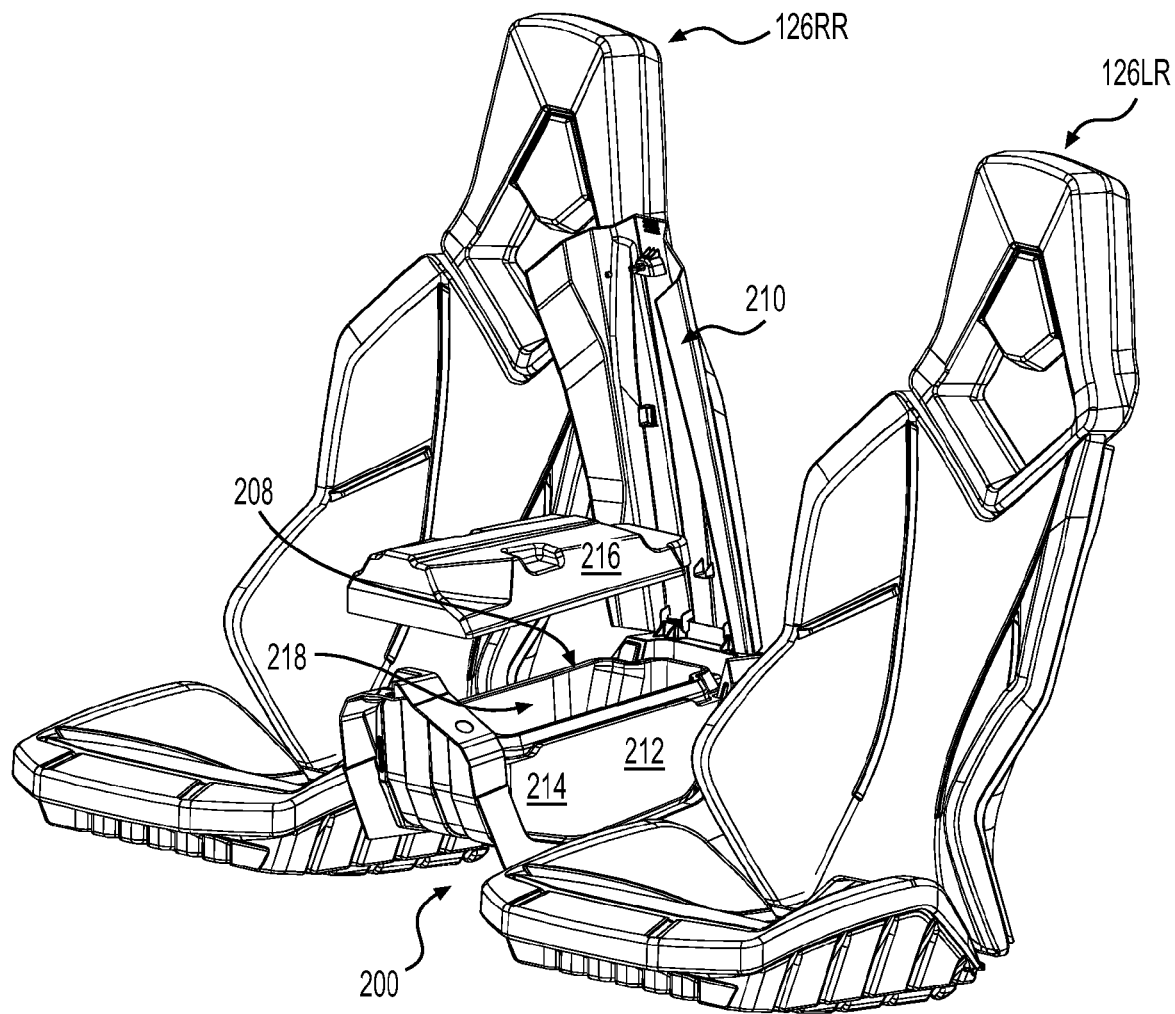
FIG. 8 is left front perspective view of the rear seats and a portion of the center console of the vehicle of FIG. 1, similar to FIG. 7 with the storage compartment cover of the console open and the top portion of the storage bin having been removed from the bottom portion.

Storage bin 212 in this embodiment is a two piece-structure. Storage bin 212 has a bottom piece 214 that itself has four side walls and a bottom wall forming a storage cavity 218 within the storage bin 212. The four side walls and the bottom wall can be interconnected so that bottom piece 214 can be sealed and thus can contain liquid. In one embodiment, storage bin 212 is a cooler having insulated side and bottom walls. Bottom piece 214 has an exterior shape congruous with the shape defined by the center console into which the bottom piece 214 fits. Storage bin 212 also has a top piece 216 that is selectively securable to the bottom piece 214 to close off the storage cavity 218. As is shown in FIG. 8, the top piece 216 may be removed from the bottom piece 216 while the bottom piece 216 remains within the storage compartment 208 to allow access to the storage cavity 218. Alternatively the storage bin 212 may be removed from the storage compartment 208 as a unit with the top piece 216 secured to the bottom piece 214. Once removed from the storage compartment 208, the top piece 216 may then be removed from the bottom piece 214 allowing access to the storage cavity 218. Top piece 216 has an exterior shape that is congruous with the shape of the compartment cover 210.

Figure 3:
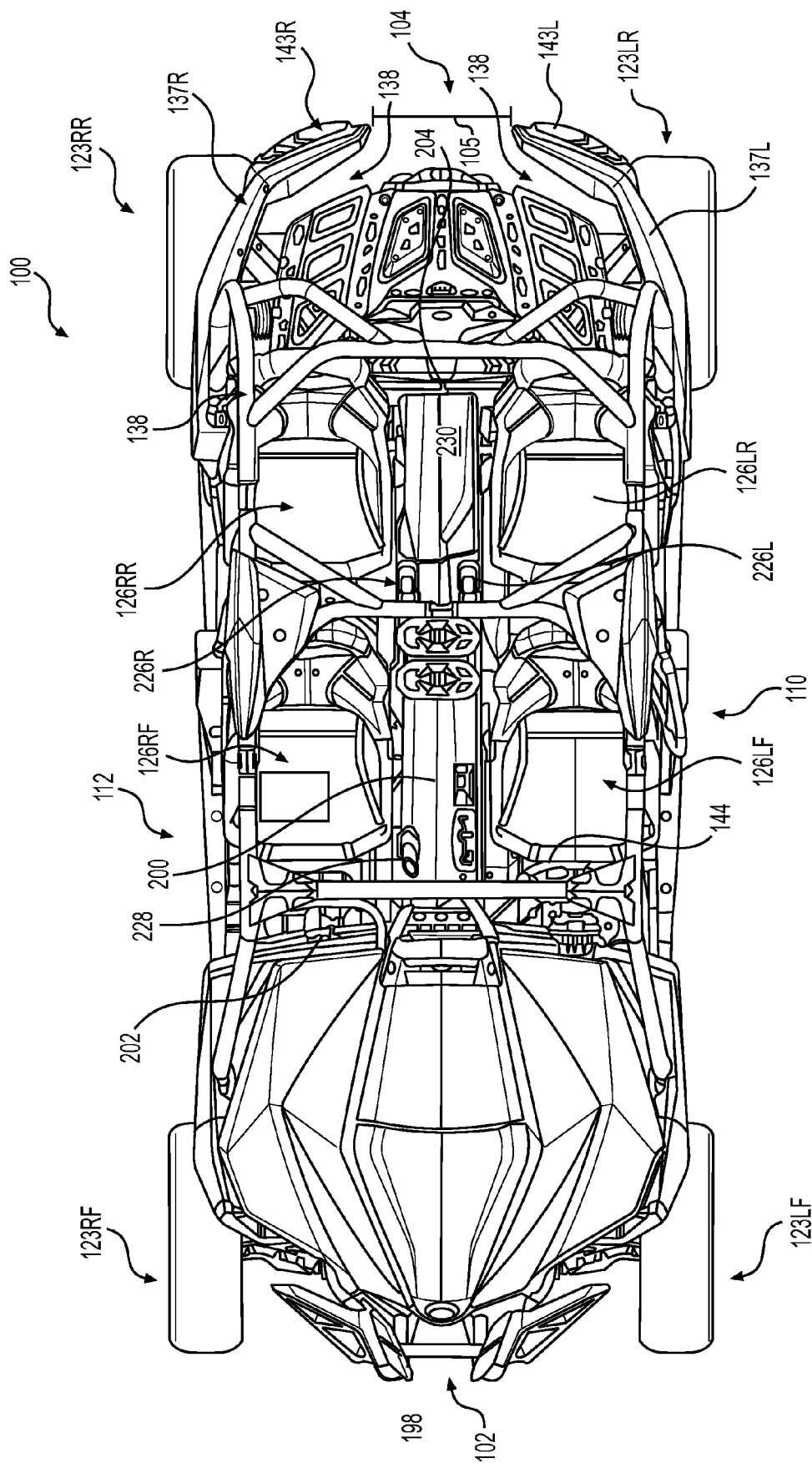
FIG. 3 is a top plan view of the vehicle in FIG. 1.

Referring to FIGS. 1 to 3, a rear left-side (driver-side) passenger grab handle 226L and a rear right-side (passenger-side) passenger grab handle 226R extend from the center console 200 forward of the armrest 230 formed by the storage compartment cover 210 of the storage compartment 208. In this embodiment the passenger grab handles 226L/226R extend from the portion 206 of the center console 200 covering the engine cylinder heads 168.

The RUV 100 has other features and components such as headlights and handles. As it is believed that these features and components would be readily recognized by one of ordinary skill in the art, further explanation and description of these components will not be provided herein.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A multi-passenger recreational utility vehicle comprising:
a frame;
at least two front wheels suspended from the frame via a front suspension assembly;
at least two rear wheels suspended from the frame via a rear suspension assembly;
an open-air seating area located rearward of the at least two front wheels and forward of the at least two rear wheels;
a front driver seat within the seating area and connected to the frame for accommodating a driver of the vehicle, the front driver seat being disposed on a driver-side of the vehicle, the front driver seat having a seat base and a backrest;
a front passenger seat within the seating area and connected to the frame for accommodating a front passenger of the vehicle, the front passenger seat being disposed on a passenger-side of the vehicle and being laterally spaced apart from the front driver seat, the front passenger seat having a seat base and a backrest;
a rear driver-side passenger seat within the seating area and connected to the frame for accommodating a rear driver-side passenger of the vehicle, the rear driver-side passenger seat being disposed on the driver-side of the vehicle and being longitudinally spaced apart from the front driver seat, the rear driver-side passenger having a seat base and a backrest;
a rear passenger-side passenger seat within the seating area and connected to the frame for accommodating a rear passenger-side passenger of the vehicle, the rear passenger-side passenger seat being disposed on the passenger-side of the vehicle and being longitudinally spaced apart from the front passenger seat and being laterally spaced apart from the rear driver-side passenger side, the rear passenger-side passenger seat having a seat base and a backrest;
a roll cage extending upwardly from the frame for assisting in protecting the seating area;
a steering device disposed within the steering area forward of the front driver seat and connected to the frame, the steering device being operatively connected to the at least two front wheels for steering the vehicle;
an engine connected to the frame;
a transmission operatively connected to the engine and to at least one of the at least two front wheels and the at least two rear wheels, the transmission for transmitting force from the engine to the at least one of the at least two front wheels and the at least two rear wheels for propelling the vehicle; and
a CVT cover and a storage space bounded by the CVT cover, an underside of one of the rear passenger seats, and a floor of the vehicle.

2. The multi-passenger recreational utility vehicle of claim 1, wherein at least a majority of the engine is: (a) longitudinally disposed forward of the backrests of the rear seats and rearward of the backrests of the front seats, and (b) laterally disposed between the driver-side seats the passenger-side seats.

3. The multi-passenger recreational utility vehicle of claim 1, wherein the engine has an output shaft, the output shaft being longitudinally forward of the backrests of the rear seats and rearward of the backrests of the front seats.

4. The multi-passenger recreational utility vehicle of claim 3, wherein the engine output shaft is located between a forward end and a rear end of one of the seat bases of one of the rear passenger seats.

5. The multi-passenger recreational utility vehicle of claim 3, wherein the transmission is a CVT having a drive pulley and a driven pulley, the driven pulley having a driven pulley axis, and the driven pulley axis being located between a forward end and a rear end of at least one of the seat bases of one of the rear passenger seats.

6. The multi-passenger recreational utility vehicle of claim 1, wherein the transmission is a CVT, the CVT being located on one side of a longitudinal centerline of the vehicle, at least partially under one of the seats.

7. The multi-passenger recreational utility vehicle of claim 6, wherein the CVT includes a drive pulley and a driven pulley, the driven pulley being located at least partially under one of the seat bases of one of the rear passenger seats.

8. The multi-passenger recreational utility vehicle of claim 1, further comprising:
   a center console extending within the seating area intermediate the front driver seat and the front passenger seat and intermediate the rear driver-side seat and the rear passenger-side set, a first portion of the center console forming a storage compartment within the console;
   a storage compartment cover covering the storage compartment, the storage compartment cover forming a rear passenger armrest when covering the storage compartment; and
   an inner accessory inside the center console, the inner accessory being removeable from the center console, the inner accessory being selectively openable.

9. The multi-passenger recreational utility vehicle of claim 8, wherein a second portion of the center console forms an engine cover covering the engine.

10. The multi-passenger recreational utility vehicle of claim 9, wherein the engine cover covers at least one cylinder head of the engine.

11. The multi-passenger recreational utility vehicle of claim 8, further comprising:
   a rear passenger-side grab handle extending from the center console forward of the rear passenger armrest; and
   a rear driver-side grab handle extending from the center console forward of the rear passenger armrest.

12. The multi-passenger recreational utility vehicle of claim 11, wherein the grab handles extend from the center console above the engine.

13. The multi-passenger recreational vehicle of claim 8, wherein the center console extends longitudinally within the seating area from a front point forward of the front seats to a rear point at least even with the backrests of the rear seats.

14. The multi-passenger recreational vehicle of claim 8, wherein the center console extends longitudinally within the seating area from a front dashboard to a rear point at least even with the backrests of the seats.

15. The multi-passenger recreational vehicle of claim 1, wherein
   the seat base of the rear driver-side passenger seat has a seat frame and a seat cushion, the rear driver-side passenger seat being connected to the frame solely via a rear cantilevered connection of the seat base to upstanding frame members; and
   the seat base of the rear passenger-side passenger seat has a seat frame and a seat cushion, the rear passenger-side seat being connected to the frame solely via a rear cantilevered connection of the seat base to upstanding frame members.

16. The multi-passenger recreational vehicle of claim 15, wherein the upstanding frame members are rearwardly angled.

17. The multi-passenger recreational vehicle of claim 1, wherein
   the seat base of the rear driver-side passenger seat has a seat frame and a seat cushion, the rear driver-side passenger seat being connected to the frame solely via a braced rear cantilevered connection of the seat base to upstanding frame members; and
   the seat base of the rear passenger-side passenger seat has a seat frame and a seat cushion, the rear passenger-side seat being connected to the frame solely via a braced rear cantilevered connection of the seat base to upstanding frame members.

18. The multi-passenger recreational vehicle of claim 17, wherein the upstanding frame members are rearwardly angled.

19. The multi-passenger recreational vehicle of claim 1, further comprising at least one of: (a) a rear driver-side storage area under the rear driver-side passenger seat base; and (b) a rear passenger-side storage area under the rear passenger-side passenger seat base.

20. The multi-passenger recreational vehicle of claim 1, further comprising a transmission cover covering at least in part the transmission and extending under at least one of the rear driver-side passenger seat base and the rear passenger-side seat base.

21. The multi-passenger recreational vehicle of claim 20, wherein a footrest area is disposed laterally outwardly of the transmission cover.

22. The multi-passenger recreational vehicle of claim 1, wherein the engine is disposed lower than the seat bases of the rear seats.

23. The multi-passenger recreational utility vehicle of claim 22, wherein the seat frames of the rear seats are disposed higher than the seat bases of the front seats.

24. The multi-passenger recreational vehicle of claim 23, wherein a top of the engine is disposed higher than the seat bases of the front seats.

25. The multi-passenger recreational vehicle of claim 1, further comprising one of a cargo rack and a cargo box at the rear of the vehicle.

26. A multi-passenger recreational utility vehicle comprising:
   a frame;
   at least two front wheels suspended from the frame via a front suspension assembly;
   at least two rear wheels suspended from the frame via a rear suspension assembly;
   an open-air seating area located rearward of the at least two front wheels and forward of the at least two rear wheels;
   a front driver seat within the seating area and connected to the frame for accommodating a driver of the vehicle, the front driver seat being disposed on a driver-side of the vehicle, the front driver seat having a seat base and a backrest;
   a front passenger seat within the seating area and connected to the frame for accommodating a front passenger of the vehicle, the front passenger seat being disposed on a passenger-side of the vehicle and being laterally spaced apart from the front driver seat, the front passenger seat having a seat base and a backrest;

a rear driver-side passenger seat within the seating area and connected to the frame for accommodating a rear driver-side passenger of the vehicle, the rear driver-side passenger seat being disposed on the driver-side of the vehicle and being longitudinally spaced apart from the front driver seat, the rear driver-side passenger having a seat base and a backrest;

a rear passenger-side passenger seat within the seating area and connected to the frame for accommodating a rear passenger-side passenger of the vehicle, the rear passenger-side passenger seat being disposed on the passenger-side of the vehicle and being longitudinally spaced apart from the front passenger seat and being laterally spaced apart from the rear driver-side passenger side, the rear passenger-side passenger seat having a seat base and a backrest;

a roll cage extending upwardly from the frame for assisting in protecting the seating area;

a steering device disposed within the steering area forward of the front driver seat and connected to the frame, the steering device being operatively connected to the at least two front wheels for steering the vehicle;

an engine connected to the frame;

a transmission operatively connected to the engine and to at least one of the at least two front wheels and the at least two rear wheels, the transmission for transmitting force from the engine to the at least one of the at least two front wheels and the at least two rear wheels for propelling the vehicle;

a center console extending within the seating area intermediate the front driver seat and the front passenger seat and intermediate the rear driver-side seat and the rear passenger-side set, a first portion of the center console forming a storage compartment within the console;

a storage compartment cover covering the storage compartment, the storage compartment cover forming a rear passenger armrest when covering the storage compartment;

an inner accessory inside the center console, the inner accessory being removeable from the center console, the inner accessory being selectively openable;

a rear passenger-side grab handle extending from the center console forward of the rear passenger armrest; and a rear driver-side grab handle extending from the center console forward of the rear passenger armrest.

\* \* \* \* \*

UNITED STATES PATENT AND TRADEMARK OFFICE
CERTIFICATE OF CORRECTION

| | | |
|---|---|---|
| PATENT NO. | : 9,266,417 B2 | Page 1 of 1 |
| APPLICATION NO. | : 14/376011 | |
| DATED | : February 23, 2016 | |
| INVENTOR(S) | : Daniel Nadeau et al. | |

It is certified that error appears in the above-identified patent and that said Letters Patent is hereby corrected as shown below:

In the Claims:

Claim 2, Column 12, line 66, "the driver-side seats the passenger-side" should read -- the driver-side seats and the passenger-side --

Signed and Sealed this
Tenth Day of May, 2016

Michelle K. Lee
*Director of the United States Patent and Trademark Office*